US010680993B2

(12) United States Patent
Snibbe

(10) Patent No.: US 10,680,993 B2
(45) Date of Patent: Jun. 9, 2020

(54) SONIC SOCIAL NETWORK

(71) Applicant: Facebook, Inc., Menlo Park, CA (US)

(72) Inventor: Scott Snibbe, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 23 days.

(21) Appl. No.: 15/941,730

(22) Filed: Mar. 30, 2018

(65) Prior Publication Data

US 2019/0306105 A1 Oct. 3, 2019

(51) Int. Cl.
*H04L 12/58* (2006.01)
*G10L 15/18* (2013.01)
*G10L 15/22* (2006.01)
*G10L 15/30* (2013.01)
*G10L 25/63* (2013.01)

(52) U.S. Cl.
CPC .......... *H04L 51/32* (2013.01); *G10L 15/1815* (2013.01); *G10L 15/22* (2013.01); *G10L 15/30* (2013.01); *G10L 25/63* (2013.01); *H04L 51/24* (2013.01)

(58) Field of Classification Search
CPC ..... H04L 51/32; H04L 51/24; G10L 15/1815; G10L 15/22; G10L 15/30; G10L 25/63
USPC ......................................................... 709/206
See application file for complete search history.

(56) References Cited

U.S. PATENT DOCUMENTS

| 8,732,193 | B2* | 5/2014 | Skeen | H04L 65/4069 707/769 |
| 2018/0060320 | A1* | 3/2018 | Oganian | G06F 3/0482 |
| 2018/0189278 | A1* | 7/2018 | Garmark | G06F 3/167 |

OTHER PUBLICATIONS

Anchor, App Store Preview, Make your own podcast, Anchor FM Inc., Online Available at https://itunes.apple.com/us/app/anchor-true-public-radio/id1056182234, 2018, 2 pages.
Cowbird, Small social network combining a photo with short audio stories, Online Available at http//:cowbird.com, 2017, 1 page.
Hello—Audio Social Network, Hello Entertainment, audio conversations with strangers, Version 3.0.6, https://itunes.apple.com/us/app/hello-audio-social-network/id1079611662?mt=8, 2018, 2 pages.
Introducing Anchor, the First True Public Radio, Anchor, online Available at https://medium.com/anchor/introducing-anchor-the-first-true-public-radio-9d4c98c0a495, Feb. 9, 2016, 6 pages.

(Continued)

*Primary Examiner* — Tauqir Hussain
(74) *Attorney, Agent, or Firm* — Kilpatrick Townsend & Stockton LLP

(57) ABSTRACT

An audio social networking environment is described that provides a platform for users to generate audio-only content for consumption by one or more other users that may or may not have a social networking relationship with the user creating the audio-only content. Users are able to verbally generate stories using an audio based virtual assistant that receives the stories. The stories are analyzed to identify a tone of the story and one or more categories to associate with the story. The analysis of the story can also include suggesting audio effects to the user for including in the story. When a user requests stories, the user preference information of the requester can be used to identify stories for playback that meet the requesting user's preferences.

20 Claims, 6 Drawing Sheets

(56) References Cited

OTHER PUBLICATIONS

Podcasting on Soundcloud, Online Available at https://soundcloud.com/for/podcasting, accessed from the internet on Apr. 12, 2018, 4 pages.

Pundit Stickers, the Sticker Search Engine, mobile social network for audio clips with broadcast and chat models, including audio filters/effects, Online Available at https://getpundit.com/, 2017, 1 page.

Soundcloud, Social network for original audio, podcasts, and remixes, music-centered, Online Available at http://soundcloud.com, accessed from the internet on Apr. 12, 2018, 2 pages.

Jacobson, Is Audio Platform Anchor the Next Big Thing for Social Media?, Mobile Publishing Tools & Technology, Online Available at https://www.clickz.com/is-audio-platform-anchor-the-next-big-thing-for-social-media/100931/, May 31, 2016, 8 pages.

Roof, Pundit Launches an Audio Social Media App for Millennials, Online Available at https://techcrunch.com/2016/09/12/pundit-launches-an-audio-social-media-app-for-millennials/, Sep. 13, 2016, 17 pages.

\* cited by examiner

SONIC SOCIAL NETWORK

BACKGROUND

Social networking environments are currently visually based systems. For example, users can view posts that include text, images, and videos. A hallmark of social networking environments is the ability of users to post content as well. The posted content is also text, images, and video. Further, for social networking environments, the interface is visual, typically a graphical user interface that connects the user to the social networking environment over the Internet. However, many social network users might be interested in posting content, but are not comfortable generating the content for posting. For example, in some cases the user may not be comfortable typing content longer than a few sentences or may not have a keyboard readily available for typing a post. Further, text postings often do not easily convey emotion or feeling that a user may want to convey in a post. In other cases, the user may have a video camera available, but the user may not be comfortable appearing on video or in images because the user may be self-conscious. Embodiments described herein describe an audio based social networking environment to overcome these deficiencies.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing an audio-only content social networking environment, the method can include receiving, by an audio content server of the social networking system, audio-only content items. Each audio-only content item can be created by a user of the social networking system. The method can also include storing each of the audio-only content items with an indication of an associated user that created the audio-only content item. The method can also include receiving a request for an audio-only content item posted on the social networking system. The method can also include, in response to receiving the request, identifying a first audio-only content item of the audio-only content items. The first audio-only content item can be created by a second user of the social networking system, and the first user and the second user have a social networking relationship on the social networking system. The method can also include providing, by the audio content server, the first audio-only content item to the first user. Other embodiments of this method can include corresponding computer systems, apparatus, and computer programs recorded on one or more computer storage devices, each configured to perform the actions of the methods.

Implementations may include one or more of the following features. Optionally, the method can include providing an audio-only user interface. The request can be received as a verbal request via the audio-only user interface. Optionally, the audio-only user interface can provide a conversational virtual assistant for the first user to interact with. Optionally, the method can further include, for each of the plurality of audio-only content items, analyzing the audio-only content item to identify a category for the audio-only content item. The method can include storing an indication of the category for the audio-only content item. Optionally, the method can include identifying a preferred category for the first user from a user profile for the first user. The method can also include determining that the preferred category matches the category for the first audio-only content item. Optionally, the category for the audio-only content item is a mood. The method can also include analyzing the audio-only content item using semantic analysis to identify a tone indicating a mood of the associated user that created the audio-only content item. The method where the category for the audio-only content item is a topic, and where identifying the category for each of the audio-only content items includes: analyzing, by the audio content server, the audio-only content item using semantic analysis to identify a topic of the audio-only content item.

Optionally, the method can further include receiving indications of reactions, where each of the indications of reactions is an indication of a reaction to one of the audio-only content items of the plurality of audio-only content items. The method can also include ranking each of the audio-only content items using the indications of reactions associated with each of the audio-only content items.

Optionally, the method can further include receiving an indication of a reaction for the first audio-only content item. The method may also include updating a user profile for the first user indicating the reaction. The method may also include updating information associated with the first audio-only content item that indicates the reaction. Optionally, the reaction is the user cancelling playback of the first audio-only content item. Optionally, the message can include determining that the reaction is negative. Optionally, the method may also include updating the user profile for the first user indicating a negative reaction to at least one of the second user and a category associated with the first audio-only content item. Optionally, the method may also include updating information associated with the first audio-only content item that indicates the negative reaction.

Optionally, the reaction is the first user saying one or more positive words regarding the first audio-only content item. Optionally, the method can include determining that the reaction is positive. Optionally, the method may also include updating the user profile for the first user indicating a positive reaction to at least one of the second user and a category associated with the first audio-only content item. The method may also include updating, by the audio content server, information associated with the first audio-only content item that indicates the positive reaction. Optionally, the method can further include sending a notification of the (positive or negative) reaction to the second user.

Optionally, the first audio-only content item is a live broadcast.

Optionally, the method can further include analyzing the second audio-only content item using semantic analysis to identify a mood of the second audio-only content item. The method may also include identifying an audio effect associated with the mood of the second audio-only content item. The method may also include suggesting the audio effect to a third user of the plurality of users that created the second audio-only content item, where the audio effect is suggested to enhance the second audio-only content item. The method may also include receiving an indication from the third user whether to enhance the second audio-only content item with the audio effect.

The method can optionally include analyzing the request using semantic analysis to identify at least one of a mood of the first user, a category identified in the request, and a filter identified in the request. The method may also include searching the audio-only content items for a set of audio-only content items matching at least one of the mood of the first user, the category identified in the request, and the filter identified in the request. Optionally, the method may also include ranking the set of audio-only content items based at least in part on at least one of information from a user profile of the first user and indications of reactions associated with each of the audio-only content items in the set of audio-only content items.

Optionally, the information from the user profile of the first user includes at least one of a preferred category of the first user and preferred users from the plurality of users of the first user. Optionally, the method where the ranking the set of audio-only content items is further based at least in part on information from user profiles of users from the plurality of users that match at least one demographic characteristic of the first user. Implementations of the described techniques may include hardware, a method or process, or computer software on a computer-accessible medium.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

DETAILED DESCRIPTION

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Embodiments described herein include an audio social networking environment that provides a platform for users to generate audio-only content including audio-only messages to one or more other users that may or may not have a social networking relationship with the user creating the audio-only content. Because some users may find generating audio-only content easier than visual content including text, image, and/or video content, the audio social networking environment can provide a platform accessible to users that would otherwise not contribute content to the social networking environment. Additionally, audio-only content can be consumed by users without requiring the user to view anything, leaving the consuming user free to engage in other activities that require visual focus, such as driving, walking, cooking, or cleaning. Further, the audio social networking environment provides a social networking environment to visually impaired individuals that may otherwise be restricted in their ability to engage in and consume on a social networking environment.

Embodiments described herein include an audio virtual assistant and interface that a user can conversationally interact with to generate audio content and post to the audio social networking environment. Interaction can include, for example, verbally requesting content, reacting to content, creating content, and posting content.

Figure 1:
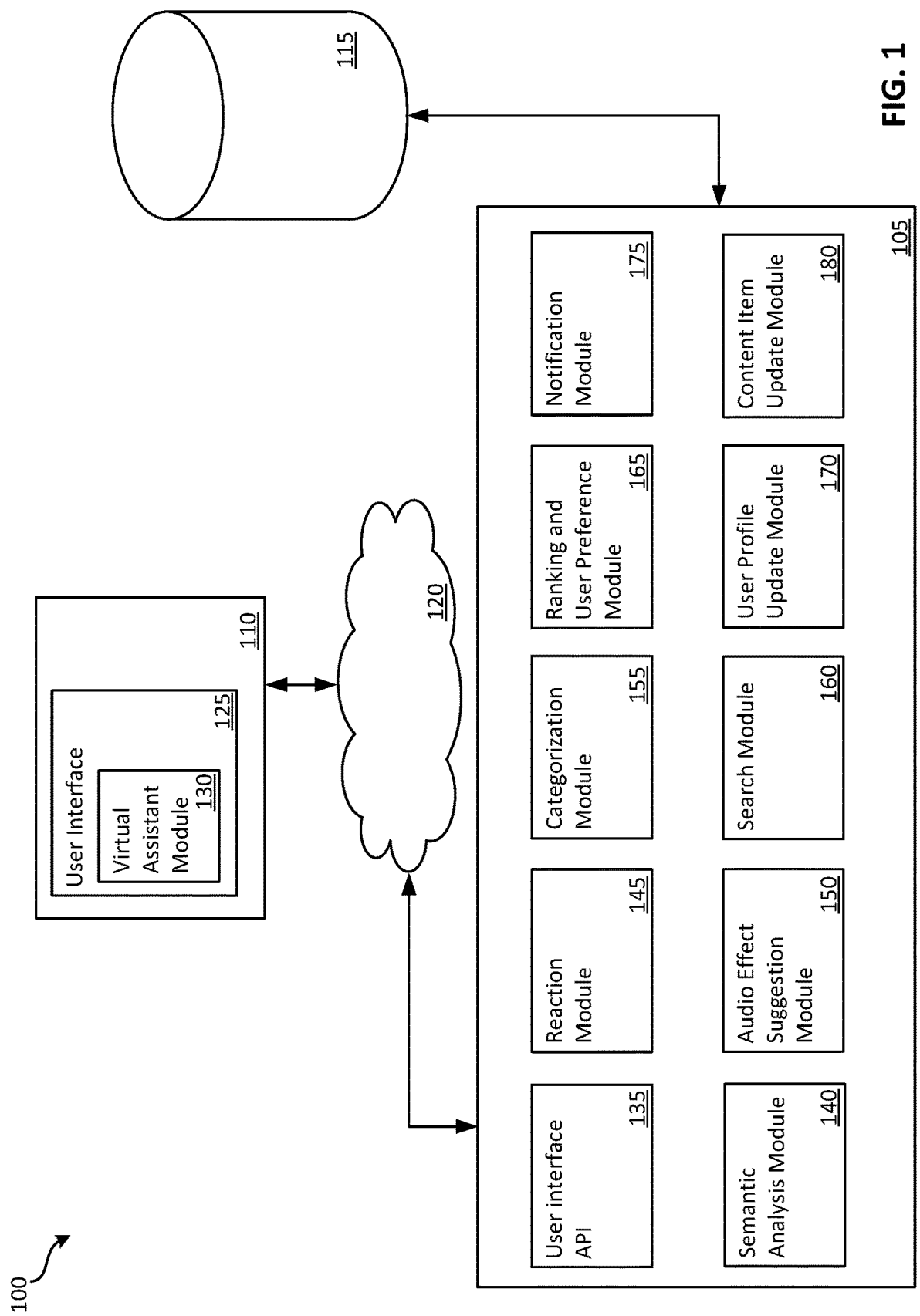
FIG. 1 illustrates an exemplary block diagram of a system for an audio-only social networking environment, according to an embodiment.

FIG. 1 illustrates an audio social networking system 100. The audio social networking system 100 can provide an audio social networking environment for users to engage in creating and consuming audio-only content. The audio social networking system 100 can be incorporated into a visual audio social networking system such that an audio-only social networking environment can be provided as a portion of the overall social networking environment, allowing users to select whether to engage in the visual social networking environment, the audio social networking environment, or both. For example, a creation of a user account on either the audio social networking environment (e.g., through an audio virtual assistant) or the visual social networking environment (e.g., through a graphical user interface) can generate a single user account that provides access to either social networking environment.

Audio social networking system 100 can include an audio content server 105, database 115, user equipment 110, and network 120. While a single user equipment 110 is shown, any number (e.g., tens, hundreds, thousands, and so forth) of user equipment 110 can be included in audio social networking system 100. Further, audio content server 105 is depicted as a single device but can be implemented with as many physical servers as desired in, for example, a cloud environment, a server farm, a server cluster, and so forth.

Social networking system 100 can provide a platform for users to create and consume audio-only content. As used herein, a story is audio-only content generated on the audio social networking system 100 by a user. A story is a recording of a user's voice telling the story. Alternatively, the story can be a story that has been generated with text to speech software. As another example, a story can be enhanced with audio effects. A story can be any duration of time. For example, a user can create a story that lasts thirty seconds, three minutes, twenty-two minutes, or any other duration of time. A story can be about any topic. For example, the user can tell a story about a sporting event, a home renovation, his dog, or any other topic of interest to a user. A story can be regarding any event. For example, the user can tell a story about a vacation he went on, her drive to work, a concert he attended, or any other event. A story can be fictional or non-fictional. For example, a user can make up a story about a date he went on, tell a true story about a date he went on, or some combination thereof. As used herein, the phrases "story" and "audio-only content" may be used interchangeably.

Network 120, which can include the Internet, may allow for bidirectional communication between any of the devices communicating over network 120. Network 120 can also comprise a cellular network, a local area network, a wide area network, a wireless network, and/or any other suitable network.

Database 115 can be any suitable database for storing data, which may optionally be stored on a back-end, secure database. Database 115 can communicate with audio content server 105 directly, wirelessly, or through any suitable network. Database 115 can store data associated with audio social networking system 100 including, for example, audio-only content (e.g., user created stories), metadata associated with the audio-only content (e.g., a title of the story, a date of the story, a creator of the story, and so forth), user profile information, and so forth. When a user creates a story, as described in more detail herein, the story can be stored in database 115. Once stored in database 115, the story can be considered posted to the social networking system 100. Certain privacy settings can be included with stories stored in database 115 such as, for example, making the story private (i.e., only the creating user can access the story), making the story accessible only to other users having a social networking relationship with the creator, making the story publicly accessible (i.e., any other user can access the story), or any other suitable privacy setting. Such privacy settings can be used to limit access to posted stories.

User equipment 110 can include a user interface 125 and a virtual assistant module 130. User equipment 110 can be any suitable device that can receive, process, and present audio content. For example, an interactive speaker having no visual interface that may accept only voice commands can be user equipment 110. Examples of interactive speakers can include headphones that are interconnected with a smartphone or other computing device, a standalone audio-only device, smart headphones that incorporate a microphone, speakers, a processor, and memory capable of performing the functions described herein. Optionally, user equipment 110 can include a visual interface, such as for example, a smartphone, a tablet, a laptop computer, a desktop computer, and so forth. User equipment 110 can be a wired device or a wireless device, meaning that user equipment 110 can communicate via network 120 via a physical connection, such as a cable, or over wireless communication such as, for example, Bluetooth® connectivity, WiFi®, and so forth. The details of how user equipment 110 can connect to and communicate over network 120 are recognized by the person of ordinary skill.

User interface 125 can be an audio interface. User interface 125 can utilize virtual assistant module 130 to interact with the user. For example, the user can conversationally interact with the audio social networking environment via user interface 125. The user can use a wake word, for example, to begin engaging with the virtual assistant module 130. Once engaged, the user can use natural language to communicate via the user interface 125 and interact with virtual assistant module 130. For example, the user can say "play a story," "play a funny story," "play stories from Shawn," "I really like that one," "skip to the next story" "rewind that," "start this one over," "stop playing this kind of junk," "record this story about my fishing trip," "share a story," and the like. The listed voice commands are merely examples of natural language a user can utilize to interact with virtual assistant module 130.

Virtual assistant module 130 can be a natural language interpretation module that can receive the user's voice commands and initiate actions in response. For example, virtual assistant module 130 can receive a voice command such as "play a story." Virtual assistant module 130 can use natural language processing to convert the audio to text and interpret the request. Optionally, all natural language processing can be done by audio content server 105 and the response or interpretation provided to virtual assistant module 130 for communicating to the user. In response to a verbal input by the user, virtual assistant module 130 can respond to the user by providing content that was requested, responding in a conversational manner with information, and/or providing information to the audio content server 105 for processing. For example, in response to receiving the verbal input "play a story," the virtual assistant module 130 can send the request to the audio content server 105 and receive a story in response. The virtual assistant module 130 can, for example, use information associated with the story, such as a title, a creator, a category, a date, and so forth to generate a response. For example, the returned story can have a category of comedy, a creator name of Jack, a creation date that corresponds to the previous day, and a title of "my wild date." Based on this exemplary information, virtual assistant module 130 can generate and output audio such as, for example, "I think you'll like this story from Jack about his date last night." The user interface 125 can then begin playing the story. As another example, the user can enter a verbal input to create a story such as, for example, "record this story about my wild date last night." Upon receiving the verbal input, virtual assistant module 130 can record the story the user tells. The user can indicate the end of the story using a keyword such as, for example "done," or the user may stop talking. Virtual assistant module 140 can identify that the user is done based on the keyword or a sufficient pause in storytelling. Virtual assistant module 130 can further attach information to the recorded story file including, for example, the creator (i.e., the user that created the story), the date, a title (e.g., either provided by the user or generated based on words in the story or in the verbal input to begin recording the story; in this example "my wild date" can be the given title), and so forth. The user interface 125 can transmit the newly created story to the audio content server 105 for further processing, categorization, and storage.

Figure 7:
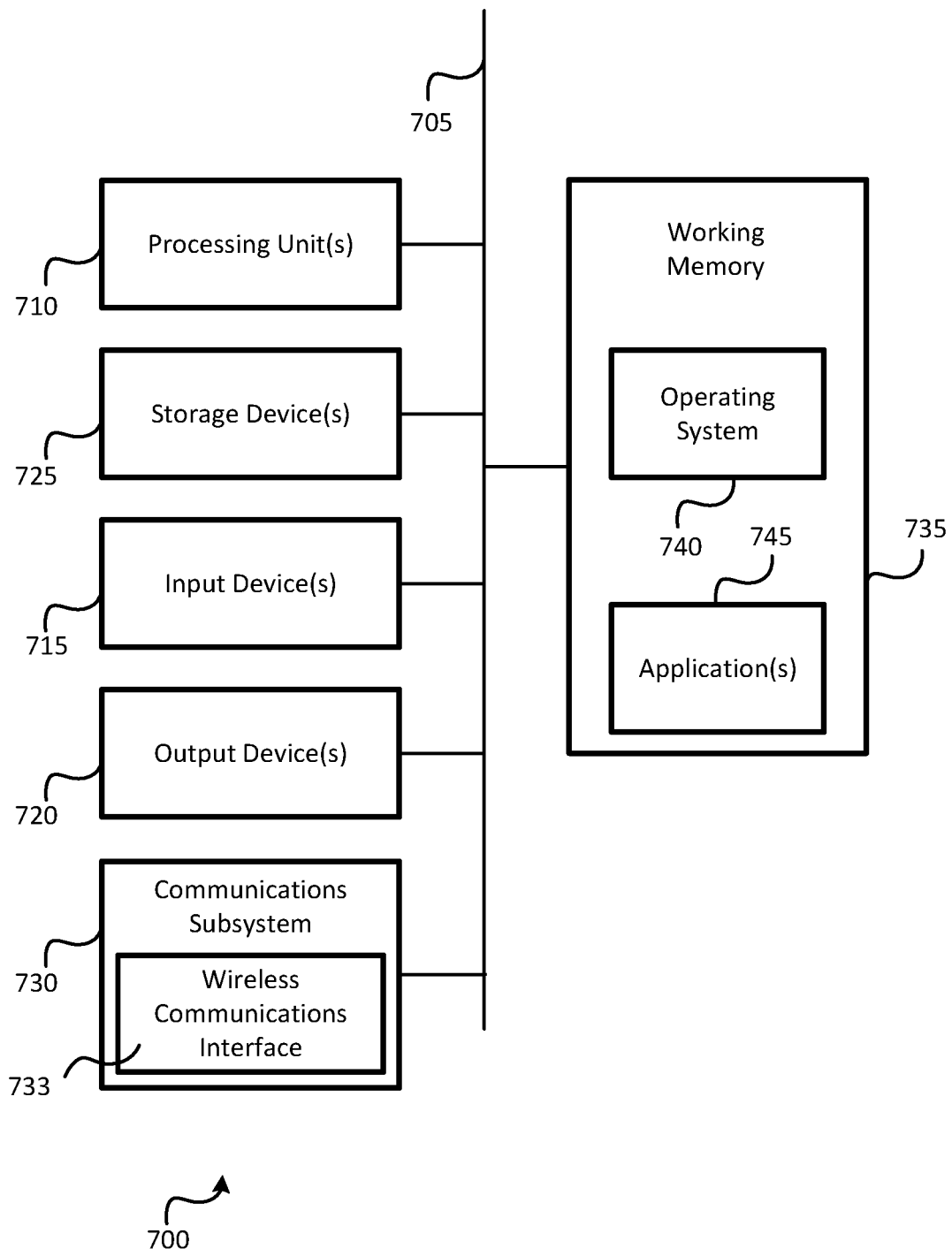
FIG. 7 illustrates an example of a block diagram of a computing system.

Audio content server 105 can be any suitable computing device including, for example, computing device 700 of FIG. 7. Audio content server 105 can be responsible for receiving the audio-only content (e.g., user created stories), categorizing the audio-only content, storing the audio-only content, searching for audio-only content in response to requests for audio-only content, and so forth as described in more detail below. Audio content server 105 includes user interface application programming interface (API) 135, semantic analysis module 140, reaction module 145, audio effect suggestion module 150, categorization module 155, search module 160, ranking and user preference module 165, user profile update module 170, notification module 175, and content item update module 180. While specific modules are described herein, the functionality of any or all of the modules can be included in more or fewer modules. Further, various modules described as providing functionality on audio content server 105 may also be incorporated on user equipment 110 to provide such functionality locally on user equipment 110 rather than via audio content server 105. The modules described with respect to audio content server 105 can further each communicate with every other module on audio content server 105 and may each be a portion of a single software application.

User interface API 135 provides a user interface API for user interface 125 to communicate with audio content server 105. Communication between user equipment 110 and audio content server 105 can be facilitated through user interface API 135.

Semantic analysis module 140 can receive the natural language input from a user and perform a semantic analysis on the input. For example, a user can tell a story, which is recorded and provided to audio content server 105. Semantic analysis module 140 can analyze at least a portion of the story. Semantic analysis module 140 can, for example, identify a tone (i.e., a mood) of the story. For example, the story may be a funny story, a sad story, a scary story, and so forth. Based on the tone of the story, the semantic analysis module 140 can associate information (e.g., metadata) with the story identifying the tone. Optionally, a story may contain more than one tone. In such cases, the semantic analysis module 140 can identify the primary tone and associate only the primary tone. Alternatively, the semantic analysis module 140 can identify all tones and associate each tone with the story. Semantic analysis module 140 can further identify a topic of the story. For example, if a story is about a sporting event, semantic analysis module 140 can identify the sporting event and associate that information with the story.

Optionally, the verbal input of the user can include a reaction to audio-only content consumed by the user. The verbal input can be analyzed by semantic analysis module 140 to determine a type of the reaction. For example, if the user says "I like that story," semantic analysis module 140 can determine that the reaction is positive. If the user laughs during a story, semantic analysis module 140 can identify the laugh as a positive reaction. If the user says "don't play any more junk like this," semantic analysis module 140 can identify the reaction as negative. Any other verbal input during playback of an audio-only content (story) can similarly be interpreted by semantic analysis module 140. Additionally, semantic analysis module can identify a tone of the reaction, such as sarcasm. For example, if the user says "I love this story" in a sarcastic tone, semantic analysis module 140 can interpret the reaction as negative.

Upon detecting the type of reaction, semantic analysis module 140 can transmit the reaction information to reaction module 145. Alternatively, reactions can be analyzed by reaction module 145 rather than semantic analysis module 140. Reaction module 145 can associate the reaction with the appropriate story. For example, reaction module 145 can associate the reaction with the audio-only content by, for example, creating metadata that associates the reaction with the story. Additionally, reaction module 145 can identify the user that generated the reaction and associate the reaction with the user. Further, such associations can be stored in database 115 with the story and/or user profile. For example, reaction module 145 can provide the reaction including a category of the story, a creator of the story, or any other suitable information with an identifier of the user that created the reaction to user profile update module 170 for storage in database 115. Also, reaction module 145 can provide an identifier of the story as well as the reaction and an identifier of the user that created the reaction to content item update module 180 for storage in database 115.

Optionally, when a user stops playback of a story before the story is complete, the reaction can be identified as negative. Additionally, if a user plays an entirety of a story, a positive reaction can be inferred by reaction module 145. Further, when a user stops playback before completion of a story, the amount of time the user listened to the story can indicate other preferences of the consuming user. For example, if the user stopped playback at the very beginning of the story, the reaction can be identified as more negative than if the user stopped playback after listening to several minutes of the story. Additionally, if the user stopped playback directly after a sound effect, such information can be captured and stored in the user profile for later analysis.

Audio effect suggestion module 150 can suggest audio effects for newly created stories. For example, upon receiving a new story from a user, audio effect suggestion module 150 can analyze the story to identify suggestions for audio effects. Suggestions can include background music, sound effects, voice enhancers, translations, and so forth. For example, upon receiving a new story, after semantic analysis module has analyzed the story and associated a tone with it, audio effect suggestion module 150 can select background music that is appropriate for the tone of the story. The selected background music can be suggested to the user via virtual assistant module 130. Optionally, several selections can be made and provided to the user to allow the user to select one or none of the suggestions. Audio effect suggestion module 150 can also analyze the story and identify places within the story that may be appropriate for a sound effect. For example, if the story contains a phrase such as "and then I dropped the plate," audio effect suggestion module 150 can suggest a loud crashing noise be inserted right after the phrase. Audio effect suggestion module 150 can also suggest voice enhancers. For example, if the story contains a phrase such as "and then she said no way," audio effect suggestion module 150 can suggest a voice enhancer be applied to "no way" that raises the pitch of the storyteller's voice (the voice of the user creating the story). Optionally, the audio effect suggestion module 150 can suggest translations. For example, if the user creating the story speaks English but has a social networking relationship within the social networking system 100 with many users that speak Spanish, the audio effect suggestion module 150 can suggest that the story be translated to Spanish to offer a Spanish version in addition to or instead of the English version. Each of the suggestions made by audio effect suggestion module 150 can be provided through user interface API 135 to user interface 125 for suggestion to the user via virtual assistant module 130. For example, virtual assistant module may output to the user "that is a great story, Scott. Would you like to add a sound effect after the phrase "and then I dropped the plate?" The user (Scott) may respond with "what type of sound effect?" And the virtual assistant module can respond by playing the sound effect. The user can respond indicating whether he would like the sound effect added or not. The user interface 125 can send the response through user interface API 135 to audio effect suggestion module 150. If the user includes the sound effect or any other suggestions made by the audio effect suggestion module 150, the audio-only content (i.e., the story) can be modified to include the suggestion. The modified story can then be provided to the content item update module 180 for storage in database 115.

Categorization module 155 can identify one or more categories of audio-only content. For example, when a user creates a new story, categorization module 155 can associate one or more categories with the audio-only content. For example, categorization module 155 can identify a category of the story based on the tone associated with the story as identified by the semantic analysis module 140. For example, if the semantic analysis module 140 identified the tone of the story as funny, one category associated with the story can be comedy. As another example, if the identified tone of the story was scary, the category can be suspense. Additionally, a category can be selected based on the topic of the story. For example, if an identified topic of the story is the user's dog, the identified category can be pets. Categorization module 155 can identify all categories that the story should be included in. All categories can be associated with the story, and the information can be provided to content item update module 180 for storage in association with the story in database 115.

Search module 160 can search for and identify a story in response to a user request for an audio-only content (story) using all available information about the user and/or the story. For example, the user may make a generic request (e.g., play a story) or a more specific request (e.g., play a funny story). The search can be narrowed by the details included in the request (e.g., a topic, category, tone, creator, and so forth identified in the request). Beginning with the details included in the request, the search module 160 can begin to filter results. Further, search module 160 can limit the search to stories created by other users that have a social networking relationship with the requesting user. Optionally, the request may include a specific creator, in which case the search can be limited to stories created by the specified user. Optionally, information about the user's mood can be identified based on input received that is temporally close to the request or included in the request itself. For example, the requesting user's mood can be identified based on a tone of voice used in the request. Optionally, other noises that happen close in time to the request can indicate a mood of the requestor. For example, crying or laughing can indicate a mood of the requester. The mood of the requestor can indicate a category or tone that may be appropriate for the user. For example, if the user is laughing, a comedy may be appropriate. Further, information from the user's profile can be used to identify a preferred category, preferred creators, and so forth. For example, the user's profile can include reactions to various stories previously consumed by the user. The information included in the user's profile can be used to identify a story the user is likely to enjoy. Search module 160 can utilize this information to search database 115 for stories matching the criteria identified by search module 160.

Ranking and user preference module 165 can generate user preference information for user profiles and/or work in conjunction with search module 160 to identify stories for playback to users based on requests of the user. To generate user preference information for user profiles, ranking and user preference module 165 can use machine learning algorithms to identify preferred categories, preferred creators, and other things the given user likes or dislikes. For example, if a user regularly stops playback of stories after a sound effect, a dislike of sound effects can be inferred and associated with the user profile. As another example, if the user regularly provides positive reactions to stories categorized in the suspense category (or any other specific category), that category can be identified as a preferred category for the user. Categories can include, but are not limited to, categories based on mood, categories based on topic, or categories based on rating. Categories based on mood or tone can include, for example, comedy, suspense, action, drama, romantic, and so forth. Categories based on topic can include, for example, sports, animals, family, food, and so forth. Further, stories can be rated based on content, for example, for age appropriateness and can include a rating system such as the rating used by motion pictures of G, PG, NC-17, R, X, and so forth. User profiles may also contain user specified preferences, which can be specified by a user upon creation of the profile or at any future time via virtual assistant module 130.

Ranking and user preference module 165 can identify user preferences at the time of a search or at any other time to update the user profile information. In conjunction with a search, for example, search module 160 can use the information to identify a list of stories that meet the search requirements and user preferences of the requesting user as described above. Ranking module 165 can then rank the list of stories based upon user profile information. For example, a user's preferred category can be used to rank a story higher in the list than stories having a less preferred category. At the time of the search, additional information contained in the user profile can be used to identify preferences of the user and rank the list of stories as well. For example, ranking and user preference module 165 can rank stories for a user that dislikes sound effects (as previously described) based on that dislike such that stories that include sound effects, and even taking into account the number of sound effects included in the story, can be ranked lower than those without sound effects or with fewer sound effects. Additionally, ranking and user preference module 165 can rank stories created by users that the requesting user has previously given positive reactions to higher than the stories in the list that are created by users that created stories that have fewer positive reactions, no positive reactions, or negative reactions by the requesting user. Additionally, ranking and user preference module 165 can utilize information from other users to rank the list of stories. For example, a story that has received negative reactions from other users may be ranked lower than a story that has received positive reactions from other users. Ranking and user preference module 165 can further use demographic information of users to identify users that are similar to the requesting user to identify preferences of similar users to rank stories enjoyed by the similar users higher in the list of stories for the requesting user. The above described exemplary techniques for ranking are not limiting and the skilled person will understand that any suitable ranking technique can be used to rank stories for users based on identified user preferences and/or the user preferences of other users that may or may not be identified as similar users. Additionally, ranking and user preference module 165 can identify stories that have previously been provided to the requesting user and rank those lower than stories not previously heard. Alternatively, if a user has listened to the same story every morning for the last several days or perhaps the user has developed a different pattern of listening to the same story (e.g., every Monday morning this user listens to the story), ranking and user preference module 165 can rank the story higher on the list because the user is likely to want to listen to the story again.

Ranking and user preference module 165 can return the ranked list of stories to search module 160. Search module 160 can identify a story from the ranked list to play for the user. For example, the most highly ranked story can be selected. Upon selection, search module 160 can provide the story via user interface API 135 to the user interface 125 for playback to the user.

Notification module 175 can provide notifications to a user, for example, based on user preferences or reactions provided to stories created by the user. If, for example, a user has a preferred category and/or a preferred creator, when a new story is posted by the preferred creator and/or in the preferred category, notification module 175 can send a notification to the user that a new story has posted that the user may enjoy. As another example, when a user creates a story that another user reacts to, the creating user can be notified of the reaction. For example, notification module 175 can send a notification, such as, for example, "Jack liked your story about fishing." Notifications can be sent to the user via virtual assistant module 130.

Exemplary interactions between a user and virtual assistant module 130 are provided throughout this description but should not be considered limiting. A user using natural language may utilize any variation on the language used in the examples or any other language, which can be interpreted with natural language processing and a response can be generated accordingly without departing from the scope of this disclosure.

In use, as an example use case, Tommy can interact with user equipment 110 via user interface 125 and virtual assistant module 130. For example, Tommy can say "I want to post a story." In response, virtual assistant module 130 can output "Ok, Tommy. What is your story about?" Tommy can respond with "It's a crazy story about the ghost I saw in my living room last night." Virtual assistant module 130 can process Tommy's responses with a natural language processor to determine the context of the language Tommy is using. Virtual assistant module 130 can output "That sounds interesting. Please tell me your story." Tommy can then verbally tell his story. When Tommy is done telling the story, virtual assistant module 130 can then interact with Tommy to confirm that Tommy is happy with the story (e.g., "Are you ready to post this story?"). Virtual assistant module 130 can gather further information from Tommy including, for example, whether Tommy would like to identify any other users in the story, send the story to other specific users, give the story a title, identify the story as fiction or non-fiction, identify one or more categories of the story, and so forth.

Once the story and other information is gathered from Tommy, user interface 125 can transmit the story to semantic analysis module 140 via user interface API 135 over network 120. Semantic analysis module can use natural language processing and semantic analysis to identify a tone of the story. For example, since Tommy told a story about a ghost in his living room, the identified tone may be that the tone of the story is scary. Semantic analysis module 140 can identify a topic of the story as ghosts, for example.

After (or while) semantic analysis module 140 determines the tone and topic of the story, audio effect suggestion module 150 can identify audio effects to suggest. For example, while Tommy is telling the story, he may quote something the ghost said. Audio effect suggestion module can suggest a voice enhancer for portions of the story in which Tommy is quoting the ghost (or any other person). Further, upon obtaining the tone of the story from semantic analysis module 140, audio effect suggestion module 150 can identify background music to suggest. Because the tone of Tommy's story was scary, audio effect suggestion module can suggest eerie background music, for example. Additionally, for example, Tommy's story may include a phrase, such as "when I first saw the ghost I screamed." Audio effect suggestion module can, for example, suggest a blood-curdling scream to include right after such a phrase. Upon compiling one or more suggestions for the user, audio effect suggestion module 150 can transmit the suggestions via user interface API 135 to user interface 125 over network 120 for virtual assistant module 120 to suggest to Tommy. For example, virtual assistant module 130 can output "Tommy, your story was pretty scary. Do you want to add some eerie background music?" Tommy may respond with "what do you have in mind?" Virtual assistant module 130 can play a portion of the suggested background music. Tommy can select, for example, to add the background music, decline the background music, or request different background music. The other suggestions provided by audio effect suggestion module 150 can be provided to Tommy in a similar manner for acceptance, rejection, or request for alternative options. If alternative options are requested, audio effect suggestion module 150 can generate different suggestions and transmit those for proposal to Tommy. Once all accepted suggestions are identified, the audio effects can be added to the story (audio-only content item).

After (or while) semantic analysis module 140 and audio effect suggestion module 150 perform their functions, categorization module 155 can identify one or more categories for the story. In this example, the suspense category can be identified. Further, a supernatural category can be identified. The identified categories can be associated with the story, for example, as attached metadata. The story, including the identified categories, audio effects, and properties identified by semantic analysis module 140 can be sent to content item update module 180 for storage in database 115. Content item update module 180 can store the story with the associated information and can further associate the story with Tommy's user profile, the creation date, any privacy settings that Tommy may have identified, and so forth.

To continue this use case, Tommy has a social networking relationship with Sue. Sue can request, through her user equipment 110, a story. For example, Sue can interact with virtual assistant module 130 and say "play a story." Virtual assistant module 130 can interpret the request using natural language processing, and user interface 125 can send the request via user interface API 135 over network 120 to search module 160. Search module 160 can access Sue's user profile from database 115 and see that Sue prefers stories categorized as comedy and suspense. Search module 160 can run a search for stories that are created by users that have a social networking relationship with Sue, that are of category suspense or comedy, and that have been posted within a threshold time period (e.g., 24 hours, 7 days, or any other suitable time period). When a user makes a very general request (e.g., "play a story"), various filters (e.g., a threshold time period for creation) can be placed on the search to avoid returning a large number of results. The search that search module 160 ran can return a list of stories that meet the criteria. The list of stories can be sent to ranking and user preference module 165 for ranking. Based on Sue's preference for suspense over comedy, which can be determined, for example, by the number of suspense stories she has consumed versus the number of comedy stories she has consumed, Tommy's story can have a higher ranking than other stories in the list that are not categorized as suspense stories. Further, Sue's profile can include an indication that Tommy is one of her preferred creators based on her previous positive reactions to his stories. Sue can also prefer stories with audio effects, and Tommy's story includes audio effects, so Tommy's story may continue to rank highly on the list of stories. Once complete, the ranked list of stories can be returned by ranking and user preference module 165 to search module 160. Tommy's story may rank at the top of the list of stories returned.

Search module 160 can select Tommy's story for playback to Sue based on the ranked list. Search module 160 can transmit Tommy's story to Sue's user equipment 110 via user interface API 135 over network 120. Sue's user equipment 110 can playback Tommy's story to Sue. Tommy's story may be enhanced with audio effects, but can generally be a playback of Tommy's story in Tommy's voice as recorded by Tommy's user equipment 110. During playback, for example, Sue can rewind portions of the story, gasp or laugh, stop playback early, listen to the whole story and ask for more stories like that one, and so forth. Each of these reactions can be received by user interface 125 and transmitted to reaction module 145 via user interface API 135 over network 120.

Reaction module 145 can interpret each reaction received from Sue. For example, the laugh and/or gasp can indicate a positive reaction (based on the reaction being an expected reaction to the story). The laugh and/or gasp can also indicate a negative reaction to the story if it is an unexpected reaction. For example, a laugh during a suspenseful portion of the story can indicate a negative reaction. As other examples, if Sue listened to the entire story, a positive reaction can be interpreted. If Sue finished the story and said "play more stories like that" an explicit positive reaction can be recorded. Rewinding portions of the story can indicate a positive reaction as well. Stopping playback early can indicate a negative reaction. However, if other noise is captured near the time of stopping (indicating that the user was interrupted during playback of the story) such as, for example, other voices, loud noises, or the like, a negative reaction may not be indicated. Each indicated reaction can be identified as positive, negative, neutral, or any other appropriate indicator. Reaction module 145 can provide the reaction information to user profile update module 170 and content item update module 180 for updating the reaction information associated with the story and with Sue's user profile. Additionally, reactions can be sent to notification module 175 for notifying Tommy of Sue's reactions.

As another example, a user can provide a live broadcast of a story. For example, Tommy can notify others that he will broadcast a story at a specific time. During that time, other users can opt to listen to Tommy's broadcast. In such a scenario, Tommy may say, for example, "Broadcast this story" to begin the broadcast. Further, when other users are searching for a story to which Tommy's broadcast may be a match, the other users can tune into the broadcast upon matching it.

Figure 2:
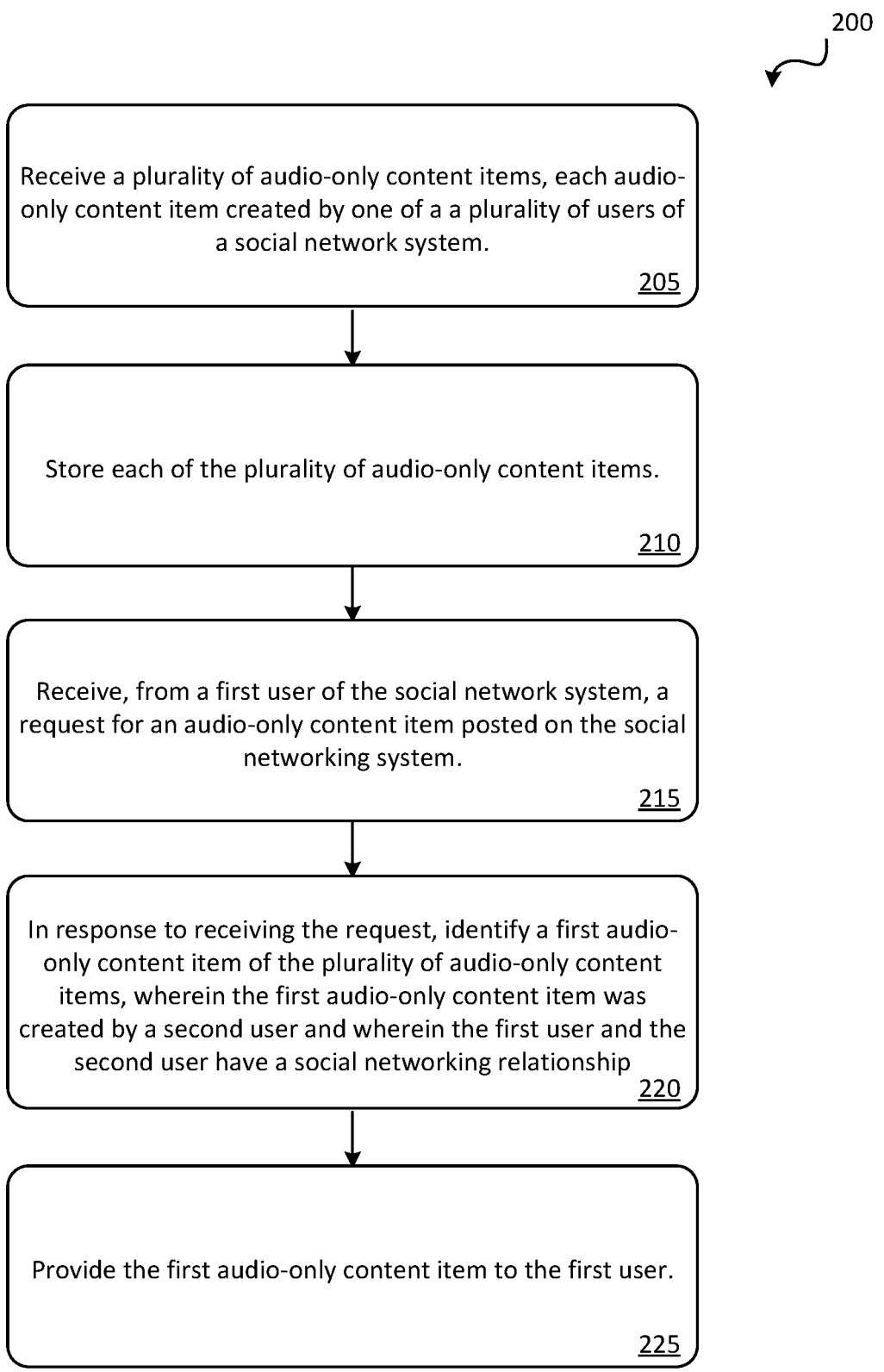
FIGS. 2-6 illustrate example methods for providing an audio-only social network environment, according to an embodiment.

FIG. 2 illustrates an exemplary method 200 for providing an audio social networking environment. Method 200 can be performed by, for example, audio content server 105 of FIG. 1. Method 200 can begin with block 205 where the audio content server can receive audio-only content items created by users of the social network. For example, many users can create stories for the audio social networking environment using an interface (e.g., virtual assistant module 130 and user interface 125 as described with respect to FIG. 1) on their own user equipment (e.g., user equipment 110). The created stories can be sent from the user's equipment to the audio content server (e.g., via user interface 125 to user interface API 135 of audio content server 105).

At block 210, the audio content server can store the audio-only content items in a database. For example, audio content server 105 can store the stories in database 115 as described with respect to FIG. 1.

At block 215, the audio content server can receive a request for an audio-only content item posted to the social networking system. Audio-only content items that are stored in the social networking system database can be posted on the social networking system. As described with respect to FIG. 1, stories posted to social networking system 100 include stories stored in database 115.

At block 220, the audio content server can identify an audio-only content item in response to receiving the request. The identified audio-only content item can be created by another user that has a social networking relationship with the requesting user. Social networking relationships can include, for example, a relationship explicitly created by one or both of the users, a relationship inferred by one or both of the users, an indirect relationship, or any other suitable relationship. A relationship explicitly created by one or both of the users can include, for example, identifying the other user as a friend or family member, following the other user's posts (which can be accomplished by explicitly requesting posts created by the other user or requesting to follow posts created by the other user as is known in social networking environments), or any other suitable explicit identification of the other user. A social networking relationship inferred by one or both of the users can include, for example, when two users both join the same social networking group. An indirect social networking relationship can be, for example, when two users both have a social networking relationship with the same third user (e.g., Sally and Tommy are both friends of Joe, so Sally and Tommy have an indirect social networking relationship. The audio content server can identify the audio-only content item in response to the request, for example, using search module 160 and ranking and user preference module 165 as described above with respect to FIG. 1.

At block 225, audio content server can provide the identified audio-only content item to the user. For example, as described with respect to FIG. 1, search module 160 can provide the selected story to user interface 125 via user interface API 135 for playback on user equipment 110 to the user.

Figure 3:
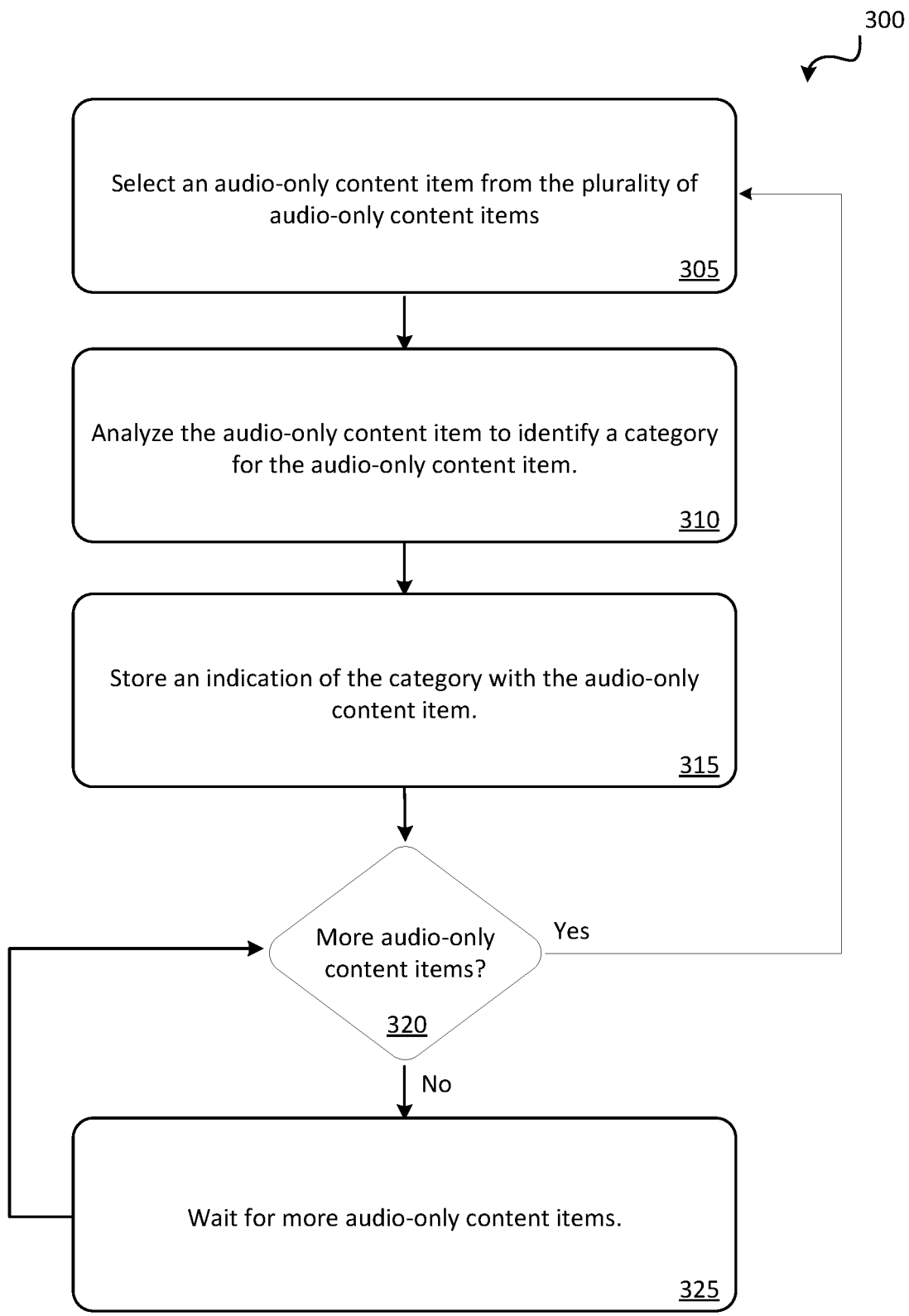

FIG. 3 illustrates a method 300 of categorizing the stories (audio-only content) posted to an audio social networking system. Method 300 can be performed by, for example, categorization module 155 of FIG. 1. Method 300 can be performed before, during, after, and/or in conjunction with method 200 of FIG. 2. Method 300 can begin with block 305. Categorization module can select an audio-only content item for analysis. For example, the audio-only content item (i.e., story) can be a newly posted story that has already been stored in database 115 or may not yet have been stored in database 115.

At block 310, the categorization module can analyze the audio-only content item to identify a category of the audio-only content item. For example, the audio-only content item can be analyzed using semantic analysis to identify a tone and/or topic of the audio-only content item. The tone and/or topic can be used to identify appropriate categories. For example, a topic of basketball can indicate a category of sports. A sad tone can indicate a category of drama.

At block 315, the categorization module can store an indication of the category with the audio-only content item. For example, metadata can be associated with the audio-only content item that indicates one or more categories. The audio-only content item can be stored in a database with the metadata or updated with the metadata.

At block 320, the categorization module can determine whether additional audio-only content items need categorization. If so, the process can continue on the next audio only content item at block 305. If not, method 300 can continue at block 325 with waiting for more audio-only content items. For example, incoming audio-only content items can trigger the process to begin at block 305. Alternatively, the categorization module can periodically check the database for new audio-only content items that have not been categorized.

Figure 4:
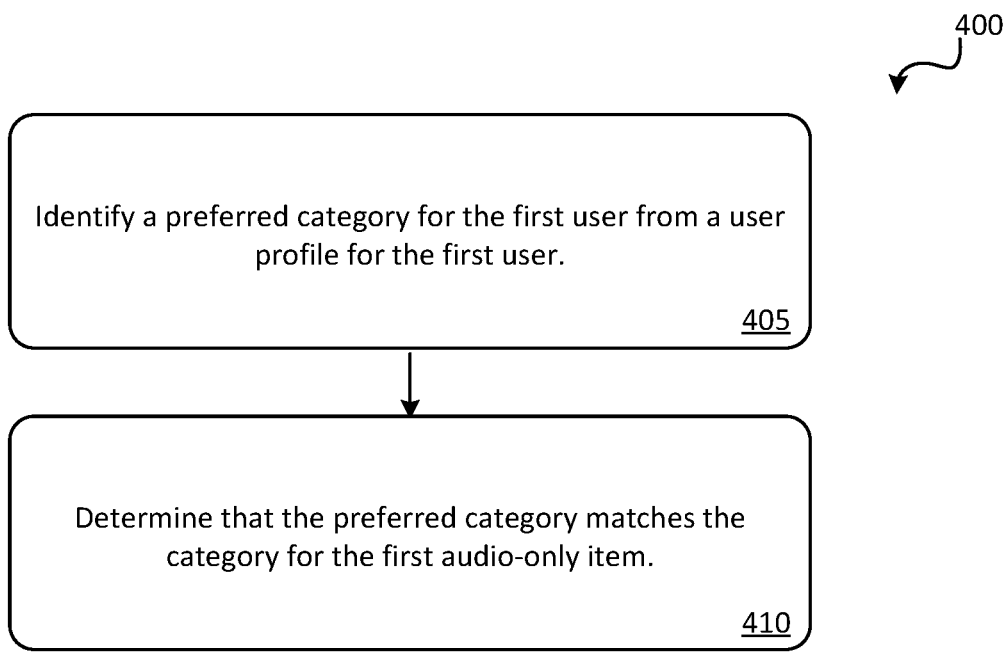

FIG. 4 illustrates a method 400 for identifying and ranking preferred categories for a user. Method 400 can be performed by, for example, ranking and user preference module 165 of FIG. 1. Method 400 can be performed before, during, after, and/or in conjunction with method 200 of FIG. 2 and/or method 300 of FIG. 3. Method 400 can begin with block 405. The user preference module can identify a preferred category for the user from the user's profile. For example, the user may have explicitly identified one or more preferred categories. Alternatively, or in addition to explicit identification of preferred categories, the user preference module can identify user preferences based on reactions to previously consumed audio-only content items. For example, if a user provides positive reactions to certain categories of stories, those categories can be identified as preferred for that user. Similarly, if a user provides negative reactions to certain categories of stories, those categories can be identified as disliked for that user. At block 410, the user preference module can identify audio-only content items that are categorized in the user's preferred categories.

Figure 5:
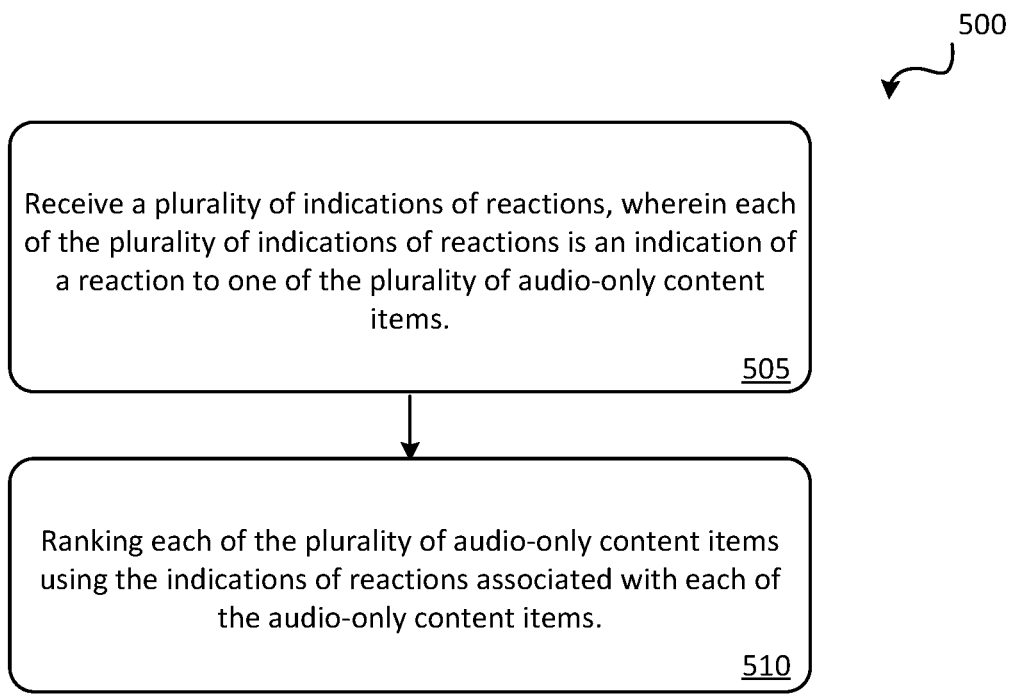

FIG. 5 illustrates a method 500 for ranking audio-only content items. Method 500 can be performed by, for example, ranking and user preference module 165 of FIG. 1. Method 500 can be performed before, during, after, and/or in conjunction with method 200 of FIG. 2, method 300 of FIG. 3, and/or method 400 of FIG. 4. Method 500 can be performed to rank a list of items returned in a search for an audio-content item for a specific user or can be performed generally on the audio-only content items stored in the audio-only content item database to rank them generally. In particular, ranking can be performed based on category. In other words, stories in a given category can be ranked against other stories in the category to generate a ranked list of stories in any given category. Method 500 can begin with block 505. The ranking module can receive indications of reactions to stories posted to the social networking system. The indications of reactions can be, for example, positive reactions, negative reactions, neutral reactions, and so forth. At block 510, the ranking module can rank the audio-only content items based on the reactions for the given audio-only content items. For example, stories that obtain many positive reactions can be ranked higher than stories with fewer positive reactions or with negative reactions. The relative number of reactions can impact the ranking as well. For example, a story that has been consumed by 100 users and has 2 positive reactions may rank lower than a story that has been consumed by 4 users and has 2 positive reactions. Other factors can impact the scoring as well including how long ago the audio-only content item was posted versus the number of reactions and so forth.

Figure 6:
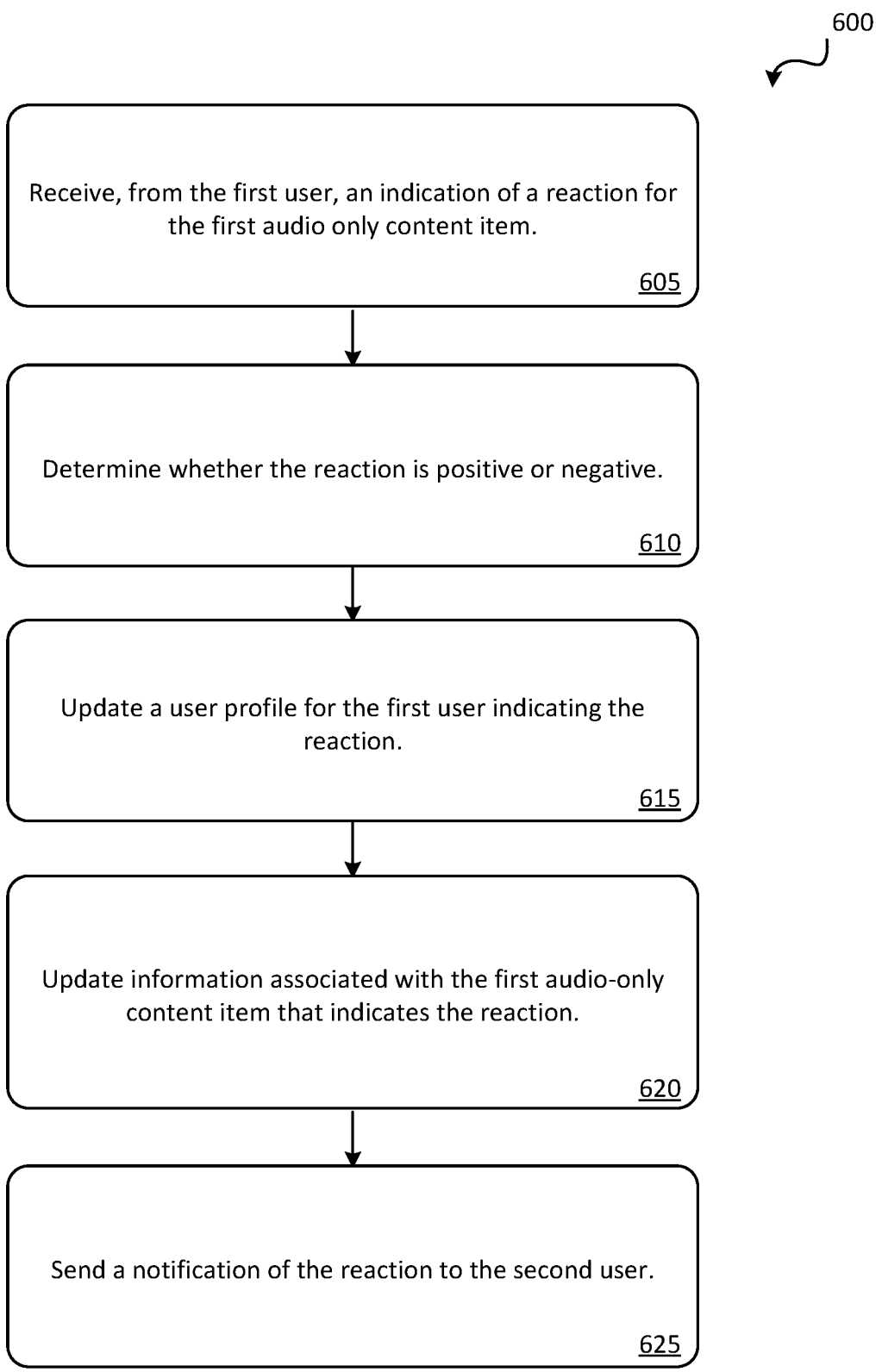

FIG. 6 illustrates a method 600 for identifying a reaction to an audio-only content item. Method 600 can be performed by, for example, reaction module 145 of FIG. 1. Method 600 can be performed before, during, after, and/or in conjunction with method 200 of FIG. 2, method 300 of FIG. 3, method 400 of FIG. 4, and/or method 500 of FIG. 5. Method 600 can begin at block 605 with the ranking module receiving an indication of a reaction for an audio-only content item. The reaction can be any reaction including a behavior, a sound, a verbal reaction, and so forth. For example, the reaction can be a behavior such as, for example, rewinding the audio-only content item or stopping the audio-only content item early. The reaction can be a sound, such as for example, a laugh, a cry, a gasp, a snort, and so forth. The reaction can be a verbal reaction such as for example "I loved that story," "that story was awful," "stop playing that garbage," "very cool," or any other verbal response.

At block 610, the reaction module can determine whether the reaction is positive or negative. For example, tone of voice in a verbal reaction can indicate whether the reaction is positive or negative and an intensity of the reaction. As an example, a user may say "that story was unbelievable." Based on the tone used, the reaction module can interpret the reaction as being positive or negative. For example, a sarcastic tone can indicate a negative reaction, an enthusiastic tone can indicate a positive reaction, an annoyed tone can indicate a negative reaction, and so forth. Further, an intensity of enthusiasm in the tone of the user can indicate an intensity of the positive or negative reaction. Behaviors can be similarly interpreted. For example, rewinding or replaying the story multiple times can indicate a positive reaction, stopping playback early can indicate a negative reaction, and so forth. Sound reactions can be interpreted in view of the story. For example, a laugh may be an expected reaction for a comedy but not for a drama. Accordingly, a laugh during a comedy can be considered a positive reaction while a laugh during a drama may be identified as a negative reaction. Optionally, an unexpected reaction such as a laugh during a drama may not be recorded as a reaction.

At block 615, the reaction module can update the user's profile with the user's reaction. For example, a positive reaction to a specific story can be indicated in the user's profile with information about the story and the positive reaction. As another example, the user's profile can be updated to indicate a positive reaction to a type of story, such as based on the category of the story.

At block 620, the reaction module can update the audio-only content item with the user's reaction. For example, if the user's reaction was positive, the audio-only content item can be updated with an indication of the positive reaction, who the reaction was from, when the reaction was provided, and/or other information about the reaction.

At block 625, the reaction module can optionally send a notification to the creator of the audio-only content item regarding the reaction. For example, a notification that another user liked the user's story can be sent.

FIG. 7 illustrates an embodiment of a computer system 700, which may be utilized and/or incorporated into one or more components of a social networking system (e.g., social networking system 100 of FIG. 1) and/or similar components of other network types. FIG. 7 provides a schematic illustration of one embodiment of a computer system 700 that can perform the methods provided by various other embodiments, such as the methods described in relation to FIGS. 2 through 6. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical or geographical locations. In some embodiments, the computer system 700 may correspond to audio content server 105 or user device 110 of FIG. 1.

The computer system 700 is shown comprising hardware elements that can be electrically coupled via a bus 705 (or may otherwise be in communication, as appropriate). The hardware elements may include processing unit(s) 710, which can include without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 3 through 6. The computer system 700 also can include one or more input devices 715, which can include without limitation a mouse, a keyboard, a camera, a microphone, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device (e.g., a random access memory (RAM) and/or a read-only memory (ROM)), any of which can be programmable, flash-updateable, and/or the like. Such storage devices may be configured to implement any appropriate data stores, including without limitation, various file systems, database structures, and/or the like.

The computer system 700 may also include a communications subsystem 730, which can include support of wireline communication technologies and/or wireless communication technologies (in some embodiments) managed and controlled by a wireless communication interface 733. The communications subsystem 730 may include a modem, a network card (wireless or wired), an infrared communication device, a wireless communication device, and/or a chipset, and/or the like. The communications subsystem 730 may include one or more input and/or output communication interfaces, such as the wireless communication interface 733, to permit data and signaling to be exchanged with a network, mobile devices, other computer systems, and/or any other electronic devices described herein. Note that the terms "user device" and "UE" are used interchangeably herein to refer to any user equipment that can receive and present to the user, for example via a speaker, the audio-only content described herein.

In many embodiments, the computer system 700 will further comprise a working memory 735, which can include a RAM and/or or ROM device. Software elements, shown as being located within the working memory 735, can include an operating system 740, device drivers, executable libraries, and/or other code, such as application(s) 745, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 3 through 6, may be implemented as code and/or instructions that are stored (e.g., temporarily) in working memory 735 and are executable by a computer (and/or a processing unit within a computer such as processing unit(s) 710); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 700 (e.g., by processing unit(s) 710) and/or might take the form of source and/or installable code, which, upon compilation and/or installation on the computer system 700 (e.g., using any of a variety of generally available compilers, installation programs, compression/decompression utilities, and so forth), then takes the form of executable code.

In various examples, computing system 700 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

Although specific embodiments have been described, various modifications, alterations, alternative constructions, and equivalents are possible. For example, customized hardware might also be used and/or particular elements might be implemented in hardware, software (including portable software, such as applets or the like), or both. Further, connection to other computing devices, such as network input/output devices, may be employed. Accordingly, embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

The terms "machine-readable storage medium," "computer-readable memory," "computer-readable storage medium," or the like includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, magnetic and/or optical media, punchcards, papertape, any other physical medium with patterns of holes, RAM, PROM, EPROM, EEPROM, FLASH-EPROM, any other memory chip or cartridge, a carrier wave as described hereinafter, or any other medium from which a computer can read instructions and/or code. A computer-program product may include code and/or machine-executable instructions that may represent a procedure, a function, a subprogram, a program, a routine, a subroutine, a module, a software package, a class, or any combination of instructions, data structures, or program statements.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms "and" and "or" as used herein may include a variety of meanings that may depend, at least in part, upon the context in which such terms are used. Typically, the term "or," if used to associate a list (e.g., A, B, or C), is intended to (and may) mean A, B, and C, here used in the inclusive sense, as well as A, B, or C, here used in the exclusive sense. Similarly, the term "and," if used to associate a list (e.g., A, B, and C), is intended to (and may) mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, and so forth.

Data Privacy—Some embodiments described herein make use of training data or metrics that may include information voluntarily provided by one or more users. In such embodiments, data privacy may be protected in a number of ways. For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure. Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification. Once collected, the data may be stored in a secure data storage location that includes safeguards to prevent unauthorized access to the data. The data may be stored in an encrypted format. Identifying information and/or non-identifying information may be purged from the data storage after a predetermined period of time. Although particular privacy protection techniques are described herein for purposes of illustration, one of ordinary skill in the art will recognize that privacy protected in other manners as well. Assuming a user's privacy conditions are met, exemplary embodiments may be deployed in a wide variety of audio systems.

What is claimed is:

1. A method for providing an audio-only content social networking environment, the method comprising:

receiving, by an audio content server of a social networking system, a plurality of audio-only content items, each audio-only content item being created by one of a plurality of users of the social networking system, wherein the plurality of audio-only content items has different categories;

storing, by the audio content server, each of the plurality of audio-only content items with an indication of an associated user of the plurality of users that created the audio-only content item;

receiving, by the audio content server from a first user of the social networking system, a request for an audio-only content item posted on the social networking system;

in response to receiving the request, identifying, by the audio content server, a first audio-only content item of the plurality of audio-only content items, wherein the first audio-only content item was created by a second user of the plurality of users of the social networking system, wherein the first user and the second user have a social networking relationship on the social networking system, and wherein identifying the first audio-only content item comprises:

identifying a preferred category for the first user, wherein the preferred category for the first user is inferred from behavior of the first user, the behavior of the first user comprising a previous reaction to a second audio-only content item of the plurality of audio-only content items, the previous reaction being a positive or negative reaction stored in association with the second audio-only content item, or comprising behavior indicative of a current mood of the first user; and searching the plurality of audio-only content items to determine that the preferred category matches a category for the first audio-only content item; and providing, by the audio content server, the identified first audio-only content item to the first user.

2. The method of claim 1, further comprising:
providing, by the audio content server of the social networking system, an audio-only user interface; and
wherein receiving the request for the audio-only content item is received as a verbal request via the audio-only user interface.

3. The method of claim 2, wherein the audio-only user interface provides a conversational virtual assistant for the first user to interact with.

4. The method of claim 1, further comprising:
for each of the plurality of audio-only content items, analyzing, by the audio content server, the audio-only content item to identify a category for the audio-only content item;
wherein storing each of the plurality of audio-only content items comprises storing an indication of the category for the audio-only content item.

5. The method of claim 4, wherein identifying the first audio-only content item comprises:
identifying, by the audio content server, the preferred category for the first user from a user profile for the first user, wherein the user profile indicates the previous reaction to the second audio-only content item.

6. The method of claim 4, wherein the category for the first audio-only content item is a mood, and wherein identifying the category for each of the audio-only content items comprises:
analyzing, by the audio content server, the audio-only content item using semantic analysis to identify a tone indicating a mood of the associated user that created the audio-only content item, wherein the semantic analysis comprises natural language processing performed on the audio-only content item.

7. The method of claim 4, wherein the category for the first audio-only content item is a topic, and wherein identifying the category for each of the audio-only content items comprises:

analyzing, by the audio content server, the audio-only content item using semantic analysis to identify a topic of the audio-only content item.

8. The method of claim 1, further comprising:
receiving, by the audio content server, a plurality of indications of reactions, wherein each of the plurality of indications of reactions is an indication of a reaction, from the first user or another user of the social networking system, to one of the plurality of audio-only content items; and
ranking, by the audio content server, each of the plurality of audio-only content items using the indications of reactions associated with each of the audio-only content items.

9. The method of claim 8, wherein the identifying the first audio-only content item is based at least in part on the ranking of the first audio-only content item.

10. The method of claim 1, further comprising:
receiving, by the audio content server from the first user, an indication of a reaction for the first audio-only content item;
updating, by the audio content server, a user profile for the first user indicating the reaction; and
updating, by the audio content server, information associated with the first audio-only content item that indicates the reaction.

11. The method of claim 10, wherein the reaction for the first audio-only content item is the first user cancelling playback of the first audio-only content item, the method further comprising:
determining, by the audio content server, that the reaction for the first audio-only content item is negative;
wherein the updating the user profile for the first user comprises updating the user profile for the first user indicating a negative reaction to at least one of the second user and a category associated with the first audio-only content item; and
updating, by the audio content server, information associated with the first audio-only content item that indicates the negative reaction.

12. The method of claim 10, wherein the reaction for the first audio-only content item is the first user saying one or more positive words regarding the first audio-only content item, the method further comprising:
determining, by the audio content server, that the reaction for the first audio-only content item is positive;
wherein the updating the user profile for the first user comprises updating the user profile for the first user indicating a positive reaction to at least one of the second user and a category associated with the first audio-only content item; and
updating, by the audio content server, information associated with the first audio-only content item that indicates the positive reaction.

13. The method of claim 12, further comprising:
sending, by the audio content server, a notification of the positive reaction to the second user.

14. The method of claim 1, wherein the first audio-only content item is a live broadcast.

15. The method of claim 1, further comprising:
in response to receiving, by the audio content server, a third audio-only content item of the plurality of audio-only content items:
analyzing, by the audio content server, the third audio-only content item using semantic analysis to identify a mood of the third audio-only content item;

identifying, by the audio content server, an audio effect associated with the mood of the third audio-only content item;

suggesting, by the audio content server, the audio effect to a third user of the plurality of users that created the third audio-only content item, wherein the audio effect is suggested to enhance the third audio-only content item; and receiving, by the audio content server, an indication from the third user whether to enhance the third audio-only content item with the audio effect.

16. The method of claim 1, wherein identifying the first audio-only content item comprises:

analyzing, by the audio content server, the request to identify at least one of the current mood of the first user, a category identified in the request, and a filter identified in the request;

searching, by the audio content server, the plurality of audio-only content items for a set of audio-only content items matching at least one of the current mood of the first user, the category identified in the request, and the filter identified in the request; and ranking, by the audio content server, the set of audio-only content items based at least in part on at least one of information from a user profile of the first user and indications of reactions associated with each of the audio-only content items in the set of audio-only content items.

17. The method of claim 16, wherein the information from the user profile of the first user comprises at least one of the preferred category for the first user and users from the plurality of users who are preferred by the first user.

18. The method of claim 16, wherein the ranking the set of audio-only content items is further based at least in part on information from a plurality of user profiles of users from the plurality of users that match at least one demographic characteristic of the first user.

19. A non-transitory, computer-readable memory having stored thereon instructions for providing an audio-only content social networking environment which, when executed by one or more processors, cause the one or more processors to:

receive a plurality of audio-only content items, each audio-only content item being created by one of a plurality of users of a social networking system, wherein the plurality of audio-only content items has different categories;

store each of the plurality of audio-only content items with an indication of an associated user of the plurality of users that created the audio-only content item;

receive, from a first user of the social networking system, a request for an audio-only content item posted on the social networking system;

in response to receiving the request, identify a first audio-only content item of the plurality of audio-only content items, wherein the first audio-only content item was created by a second user of the plurality of users of the social networking system, wherein the first user and the second user have a social networking relationship on the social networking system, and wherein to identify the first audio-only content item, the one or more processors:

identify a preferred category for the first user, wherein the preferred category for the first user is inferred from behavior of the first user, the behavior of the first user comprising a previous reaction to a second audio-only content item of the plurality of audio-only content items, the previous reaction being a positive or negative reaction stored in association with the second audio-only content item, or comprising behavior indicative of a current mood of the first user; and search the plurality of audio-only content items to determine that the preferred category matches a category for the first audio-only content item; and provide the identified first audio-only content item to the first user.

20. A social networking system comprising:

a content database; and an audio content server comprising:

one or more processors; and a memory having stored thereon instructions for providing an audio-only content social networking environment which, when executed by the one or more processors, cause the one or more processors to:

receive a plurality of audio-only content items, each audio-only content item being created by one of a plurality of users of a social networking system, wherein the plurality of audio-only content items has different categories;

store each of the plurality of audio-only content items with an indication of an associated user of the plurality of users that created the audio-only content item;

receive, from a first user of the social networking system, a request for an audio-only content item posted on the social networking system;

in response to receiving the request, identify a first audio-only content item of the plurality of audio-only content items, wherein the first audio-only content item was created by a second user of the plurality of users of the social networking system, wherein the first user and the second user have a social networking relationship on the social networking system, and wherein to identify the first audio-only content item, the one or more processors:

identify a preferred category for the first user, wherein the preferred category for the first user is inferred from behavior of the first user, the behavior of the first user comprising a previous reaction to a second audio-only content item of the plurality of audio-only content items, the previous reaction being a positive or negative reaction stored in association with the second audio-only content item, or comprising behavior indicative of a current mood of the first user; and search the plurality of audio-only content items to determine that the preferred category matches a category for the first audio-only content item; and provide the identified first audio only content item to the first user.

* * * * *